United States Patent
Elsing et al.

(12)

(10) Patent No.: US 6,293,705 B1
(45) Date of Patent: Sep. 25, 2001

(54) ANNULAR GIMBAL ASSEMBLY SUITABLE FOR DISC DRIVE SPINDLE BEARINGS AND METHOD OF MAKING SAME

(75) Inventors: John William Elsing; David John Jennings, both of Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/494,752

(22) Filed: Jan. 31, 2000

Related U.S. Application Data

(60) Provisional application No. 60/169,014, filed on Dec. 3, 1999.

(51) Int. Cl.[7] ..................................................... F16C 19/10
(52) U.S. Cl. ......................... 384/605; 384/611; 384/612; 384/613
(58) Field of Search ..................................... 384/605, 611, 384/612, 613, 620, 202

(56) References Cited

U.S. PATENT DOCUMENTS

| | | |
|---|---|---|
| 4,896,239 | 1/1990 | Ghose . |
| 5,102,241 | 4/1992 | Pflunger . |
| 5,157,295 | 10/1992 | Stefansky et al. . |
| 5,421,088 | 6/1995 | Kawamura . |
| 5,458,422 | 10/1995 | Zernickel et al. . |
| 5,697,708 | 12/1997 | Leuthold et al. . |

*Primary Examiner*—Lenard A. Footland
(74) *Attorney, Agent, or Firm*—Edward P. Heller, III; Raghunath S. Minisandram

(57) ABSTRACT

According to the present invention spindle bearings are assembled with at least one annular gimbal to compensate for undesired components of bearing compression force. Specific devices and methods are directed to compensating for either (a) operational force variations such as those caused by temperature variation or (b) assembly-related force variations such as those caused by misalignment.

14 Claims, 4 Drawing Sheets

ANNULAR GIMBAL ASSEMBLY SUITABLE FOR DISC DRIVE SPINDLE BEARINGS AND METHOD OF MAKING SAME

RELATED APPLICATIONS

This application claims the benefit of U.S. Provisional Application No. 60/169,014 filed on Dec. 3, 1999.

FIELD OF THE INVENTION

The present invention relates to spindle bearing assemblies, and more particularly to those including a plurality of raceways containing rolling members compressed with a controlled preload force.

BACKGROUND OF THE INVENTION

Although the use of such bearings is common in devices incorporating small electric motors, such as disc drives, preload force variations in such bearings are difficult to control in practice. Variations that reduce the preload force can cause play between the rotating and stationary members and/or undesired oscillations. Variations that increase the preload force can cause other problems, such as excessive or uneven wear in the bearings and/or balls.

Although some control mechanisms exist within the systems that apply the preload force, the need for spindle bearings having an internal control mechanism remains to be satisfied.

SUMMARY OF THE INVENTION

Spindle bearings are assembled with at least one annular gimbal to compensate for undesired components of bearing compression force. Spindle bearings are provided with a pair of coaxial raceways that are separated so that a first assembly can rotate with respect to a second. Balls rollingly engage the inner and outer races to maintain the races in coaxial alignment, typically with an offset preload so that the balls are kept in compression.

A preferred gimbal of the present invention has a somewhat oblong cross section along a radial half-plane and is formed integral to the assembly by cutting at least one groove about a rigid portion to make a deformable layer about 0.5 millimeters thick. Alternatively, the gimbals may be pre-formed and affixed to a rigid member to form the assembly.

Type I embodiments of the present invention compensate for operational force variations such as those caused by temperature variation. Type I devices include gimbals on one or both assemblies, compensating for variations in these forces that might otherwise become excessive. Some Type I devices are disc drives using stainless steel spindle bearings with balls made of ceramic. Ceramic balls typically have a thermal coefficient of expansion less than a fourth that of steel, often resulting in unacceptably large force variations in response to thermal variations less than 40 degrees Centigrade. Ceramic balls are much harder than stainless steel, however, resulting in favorable durability characteristics for applications such as disc drives.

A "rigid" element as used herein is a continuous mass of hard material (such as steel) of which no portion will be displaced from the rest by more than a few nanometers by ball bearing preloads less than 6 pounds. An "annular gimbal" as used herein is an annular mass of resilient material(s) such as steel arranged about an axis of symmetry. Gimbals of the present invention typically have a thickness Less than the diameter of the balls. Preferred disc drives of the present invention feature at least one spindle bearing gimbal with a spring constant 1 to 4 times larger (stiffer) than the balls in the spindle bearing assembly, under nominal normal operating conditions.

Type II embodiments of the present invention compensate for force variations that can occur during assembly, such as those caused by misalignment during the application of a preload. Gimbals of the present invention, when partially compressed or stretched, exert a restoring force that tends to equalize the preload force about the bearings. Virtually all conventional preload application mechanisms have enough give that this restorative force provides a helpful repositioning mechanism.

Additional features and benefits will become apparent to those skilled in the art upon reviewing the following figures and the accompanying detailed description.

DETAILED DESCRIPTION

Numerous aspects of disc drive or spindle bearing technology that are not a part of the present invention (or are well known in the art) are omitted for brevity. These include (1) detailed design or assembly of motor components; (2) the operation of recording discs, disc clamping mechanisms, or other technologies specific to disc drives; and (3) specific structures of basic bearing assemblies or preload application mechanisms. Although the examples below show more than enough detail to allow those skilled in the art to practice the present invention, subject matter regarded as the invention is broader than any single example below. The scope of the present invention is distinctly defined, however, in the claims at the end of this document.

Figure 1:
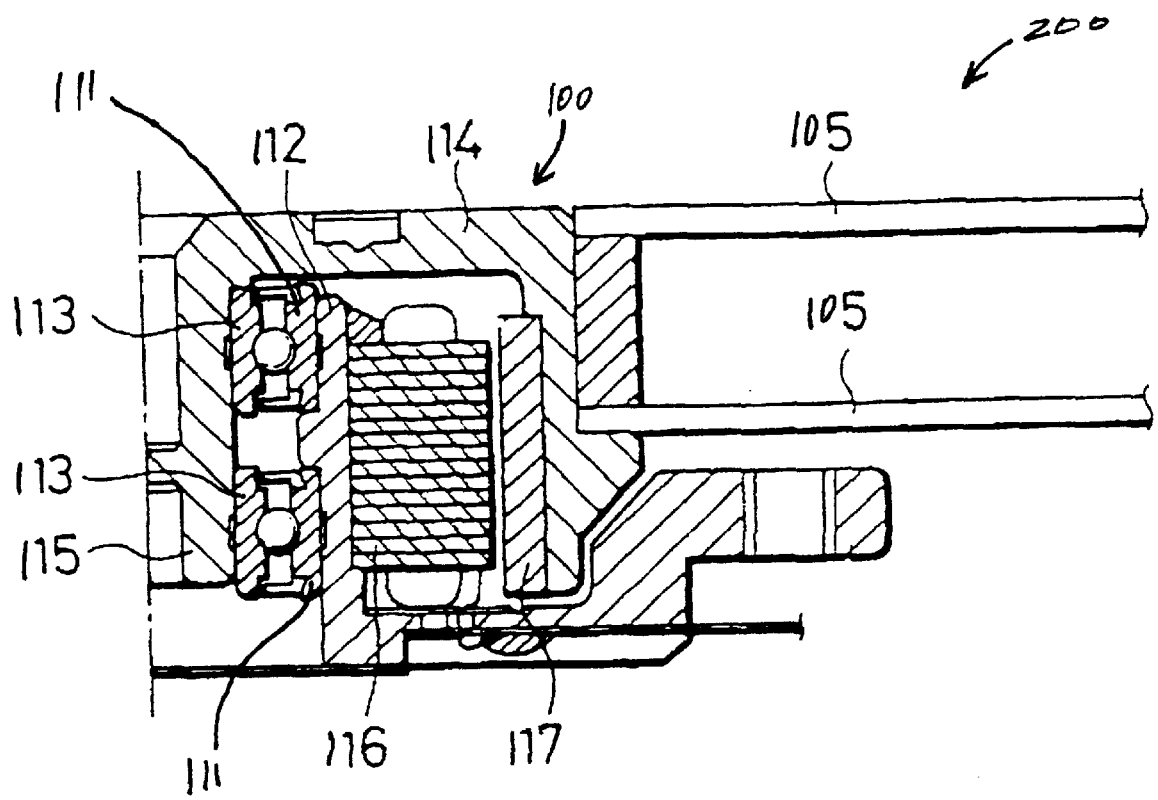
FIG. 1 shows a prior art disc drive comprising a disc stack mounted onto the hub of a spindle bearing assembly.

FIG. 1 shows a prior art disc drive 200 comprising discs 105 mounted onto a hub 114 of a spindle bearing assembly 100. Two coaxial ball bearing raceways are defined by outer bearing races 111 mounted to a rigid cylindrical support 112 and inner bearing races 113 mounted to a rigid shaft 115. An armature core 116 is mounted on the outer peripheral surface of the support 112. A drive magnet 117 is affixed onto the inner surface of the hub 114. Armature core 116 and the drive magnet 117 and other parts make up a motor, which rotates the drive magnet 117 so as to rotate the hub 114 together with the drive magnet 117.

Figure 2:
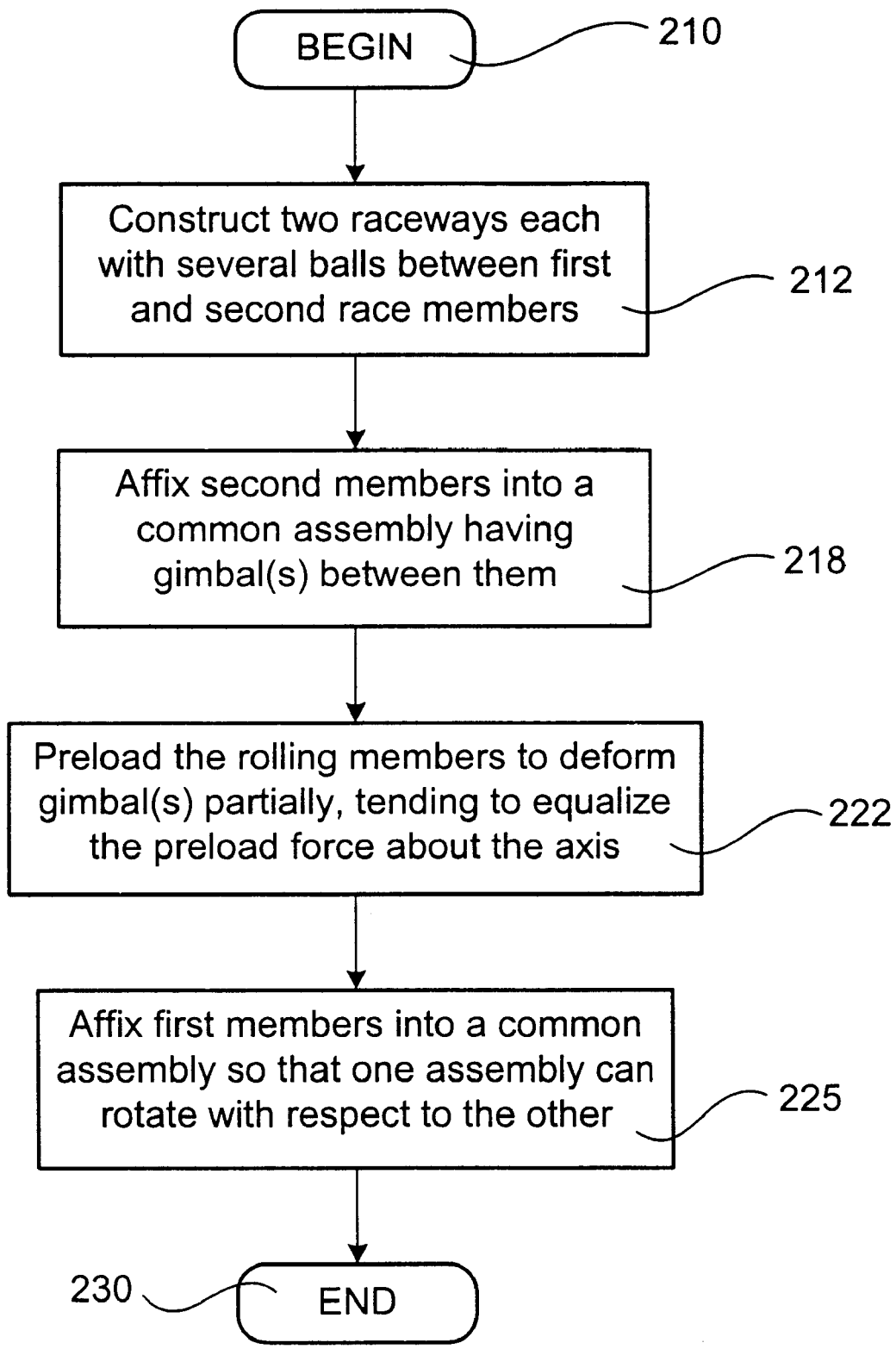
FIG. 2 shows a method of the present invention for making an improved spindle motor.

FIG. 2 shows a method of the present invention for making an improved spindle motor, including steps 210 through 230. Two raceways are constructed 212, each comprising first and second race members. Suitable races are readily available for use in constructing race members of the present invention. A "race member" as used herein is an annular race or a rigid or gimbaled assembly that includes at least one annular race. As will become clearer from a review of FIG. 4, step 212 of constructing is preferably accomplished by gluing, welding, shrink-fitting, or integrally forming extensions onto at least one of the ordinary races.

Next, the second members of each raceway are affixed together into a common assembly having at least one gimbal between the second members 218. The rolling members are then preloaded 222 so that the gimbal(s) are partially deformed as the first members are affixed into a common assembly 225. Note that at steps 222 and 225, gimbals are partially deformed so that they tend to compensate for any non-uniformity in the axial preloading force.

Figure 3:
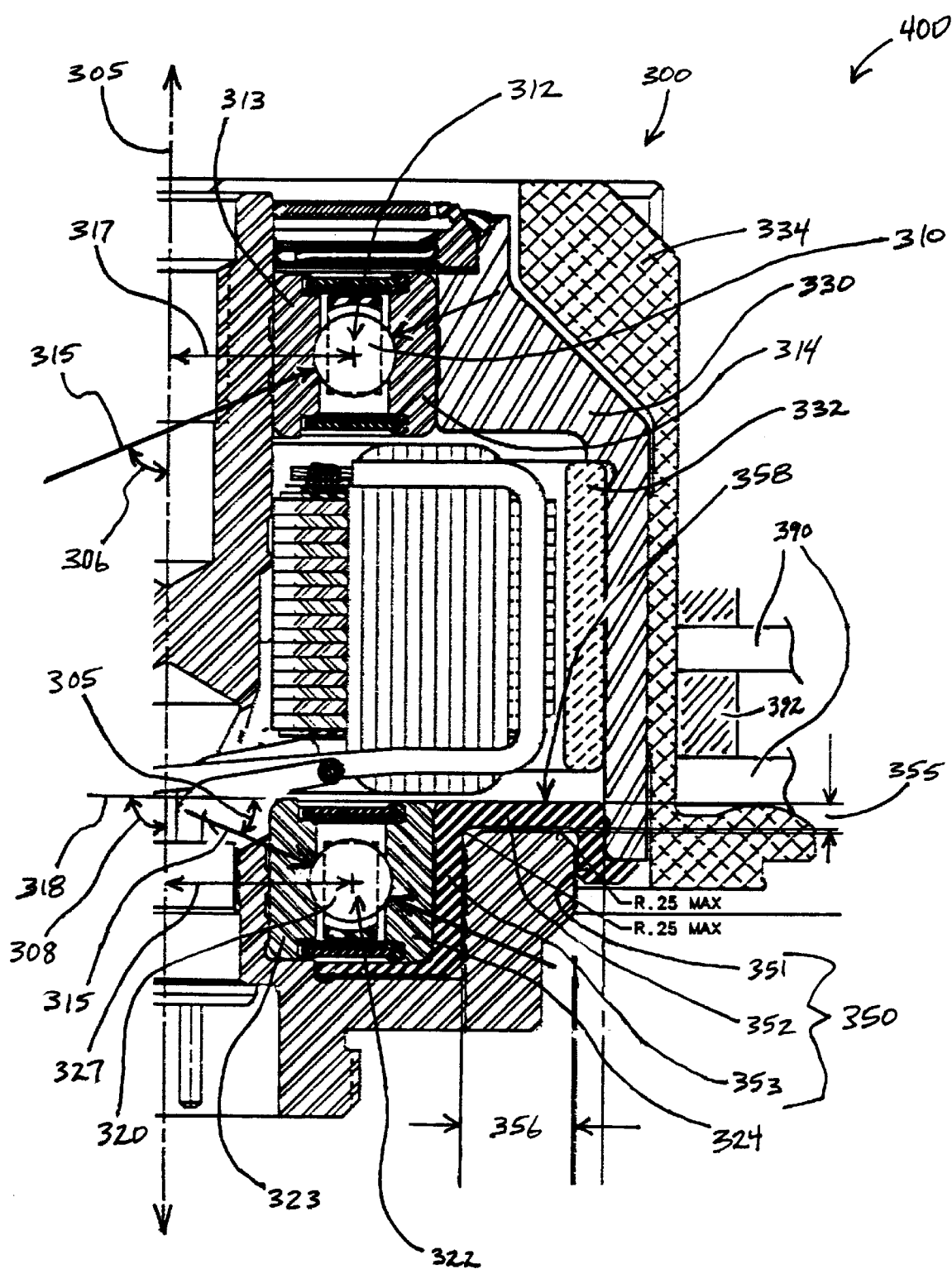
FIG. 3 shows a disc drive having a spindle bearing exemplifying the present invention with an X-type preload.

FIG. 3 shows a disc drive 400 having a spindle bearing assembly 300 of the present invention. Discs 390 are mounted in alternation with disc spacers 392 to form a disc stack having an axis of rotation 305. A first set of balls 310 is positioned for movement along a first circle 312, which is defined by the rotation of radius 317 about axis 305. Upper races 313,314 compress the balls 310 along one of the axes of compression 315 as they roll. Each of the axes of compression 315 forms an acute angle 306 with axis 305 that is preferably less than about 80 degrees. The angle 306 may be inward as shown for an "X-type" preload, or may be outward for a "diamond-type" preload. It will be seen that the angle 306 and the preload magnitude each interact with the axial gimbal-deflecting force of the present invention.

A second set of balls 320 is positioned for movement along a second circle 322 defined by the rotation of radius 327 about axis 305. Upper outer race 314, backiron 330, magnet 332, hub 334, and an outer vertical portion 351 of grooved member 350 are coupled together in a first rigid assembly that is configured for rolling engagement with the first set of balls 310. Lower outer race 324 is coupled with an inner vertical portion 353 of grooved member 350 in a second rigid assembly that is configured for rolling engagement with the second set of balls 320.

In addition to the vertical portions 351,353, grooved member 350 includes an annular gimbal 352. Gimbal 352 is operatively coupled between the first and second rigid assemblies, able to bend so that an axial force of less than 6 npounds between the rigid assemblies can produce an appreciable gimbal deformation. As gimbal deformation will be "appreciable," for clarity as used herein, if it effects a ball bearing preload reduction of at least 0.1% as compared with the force that would exist in the absence of deformation. Gimbal deformation(s) allow the first rigid assembly to move axially with respect to the second rigid assembly, even after the inner races 313,323 are coupled together to form a complete rigid assembly.

Extending "substantially along" major surface 358 (e.g. best fit by least squares method) is a reference line 318 that passes through the axis of rotation 305 and forms a hinge angle 308 therebetween which will shift as gimbal 352 deforms. Annular gimbal 352 has a thickness 355 (measured perpendicular to the reference line 318) that is desirably about about 0.2 to 0.8 millimeters, and a width 356 (along reference line 318) that is desirably about 2 to 10 times larger. The axes of compression 315 and the reference line 318 desirably form a compression transfer angle 305 (in each plane passing through axis of rotation 305). A preferred gimbal 352 of the present invention has a compression transfer angel 305 in the range of about 10 to 25 degrees.

Alternatively, the reference line 318 of a given half-plane may be defined to maximize the ratio of the gimbal width 356 to the average gimbal thickness 355 perpendicular to that width 356. This definition is also exemplified by FIG. 3.

To increase the gimbal's deflection, gimbal 352 has a major surface 358 that is substantially perpendicular (i.e. within a few degrees) to the axis of rotation 305. Note that gimbal 352 need not be a uniform layer but may take other shapes that will allow a deflection having an appreciable axial deflection such as a section of a bowl, cone shape, or toroid. In some cases, gimbal thickness will vary greatly. In the general case, a reference line is desirably constructed which is parallel to a line "substantially along" a surface midway between opposite major surface, of the gimbal. Reference line 318 meets this definition. Whatever variation in materials and geometry is used in the practice of the present invention, it is recommended that each gimbal generally have a minimum thickness that is less than the diameter of the rolling elements.

In a preferred embodiment, the balls 310,320 and the rigid assemblies essentially comprise a common alloy such as a steel, so that they expand fairly uniformly with temperature. Suitable steel balls 310,320 (e.g. SAE 52100) and rigid components optionally have a Rockwell Hardness (HRC) of about 56 to 59. In a most preferred embodiment, the balls 310,320 are instead made of a ceramic. Suitable ceramics, are readily commercially available that are significantly harder and more durable than steel. Unfortunately, ceramics generally have smaller coefficients of thermal expansion than hard alloys suitable for the rigid assemblies of a disc drive spindle bearing assembly. So that temperature variation will not cause large preload force variation, structures of this embodiment use a gimbal designed for preload force compensation.

Figure 4:
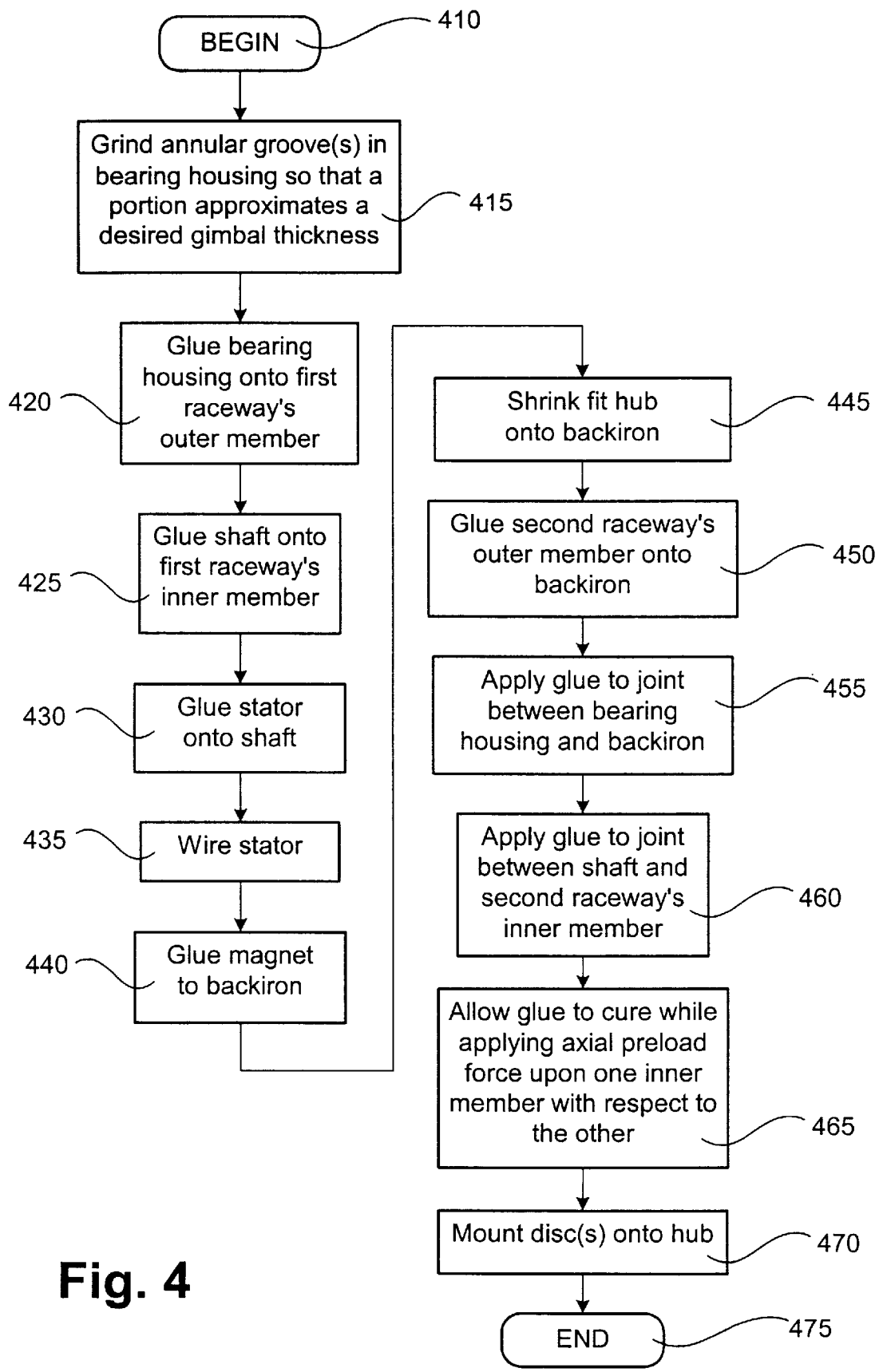
FIG. 4 shows another preferred method of the present invention.

FIG. 4 shows another preferred method of the present invention, comprising steps 410 through 475. At least one annular groove is machined into a bearing housing to provide a predetermined gimbal thickness 415. For a single-layer stainless steel gimbal such as that of FIG. 3 for use in a typical disc drive, the gimbal is desirably about 0.6 millimeters thick (with a tolerance of about 0.02 to 0.10 mm) over at least half of the gimbal's width. A nominal gimbal thickness greater than about 0.2 to 0.3 millimeters is preferred, because lesser gimbal thicknesses will require tolerances smaller than about 0.02 to 0.05 mm for a satisfactory degree of predictability in the gimbal's restorative force (i.e. modulus of elasticity). Such precise tolerances can increase manufacturing costs significantly.

Other materials may readily be substituted for part or all of the gimbal structure, so long as their dimensions are selected for similar resilience (i.e., within a few orders of magnitude). Lesser thicknesses may increase manufacturing costs because of the necessity of restrictive machining tolerances. Greater thicknesses, however, may reduce the axial range of gimbal deflection excessively.

Before or after machining the gimbal 415, the bearing housing is glued onto the first raceway's outer member 420. A large inner race element is constructed by gluing the shaft onto the first raceway's inner race 425 and onto the stator 430.

After wiring the stator 435, a large outer race element is constructed by affixing the backiron to the magnet 440, to the hub 445, and to the second raceway's outer member 450. Next, glue is applied to the bearing housing/backiron joint 455 and to the shaft/second inner race member element 460. Construction of the spindle bearing is completed by applying an axial preload while allowing the glue to cure 470. The spindle bearing can then be assembled into a disc drive, and the disc(s) can be mounted onto the hub 470.

In FIG. 3, the gimbal's movement is substantially axial (i.e. within about 1 degree of the axis of rotation) within its range. The angle between the axes of ball compression and of gimbal compression is desirably at least 5–15 degrees over the gimbal's range of motion, so that the gimbal can deflect significantly in response to ball bearing compression values less than 5 pounds.

Note that the structure of FIG. 3 can be obtained by methods other than those of FIG. 2 or 4, such as by fully deflecting the gimbal before completing the assembly. Conversely, the distinct methods of FIGS. 2 & 4 can each be used to make structures unlike that of FIG. 3, such as those having a gimbal on each of the two assemblies configured for relative rotation.

Referring again to the example of FIG. 3, Type I embodiments are presented above with a spindle bearing 300 part of which is configured for rotation about an axis 305. A first set of balls 310 is positioned for movement along a first circle 312 within a raceway about the axis 305. A second set of balls 320 is positioned for movement along a second circle 322 about the axis 305. A first member (which includes outer race 314) is configured for rolling engagement with the first set of balls 310, and a second member (which includes outer race 324) is configured for rolling engagement with the second set of balls 320. This structure is improved by the inclusion of at least one annular gimbal 352 operatively coupled between the first and second members and able to bend so that the first member (including race 314) moves axially with respect to the second member (including race 324). After placing the gimbal(s), methods of the present invention include a step 225,465 of completing one or both assemblies for relative rotation.

FIG. 3 also exemplifies preferred Type I embodiments in which each ball of at least one set 320 has an axis of compression 315 forming an angle 306 with the axis of rotation 305 that is less than about 80 degrees. FIG. 3 defines a radial half plane extending to the right of axis 305, which typifies radial half planes of the disc drive 400. A reference line 318 is shown that intersects the axis of rotation 305 at an acute angle 308 greater than 45 degrees. Each ball of at least one set 320 also has an axis of compression 315 that intersects its respective reference line 318 to form a compression transfer angle 308 that is desirably less than about 25 degrees.

Referring again to the examples of FIGS. 2 & 4, Type II embodiments are presented above as methods of assembling a spindle bearing from components including first and second bearing assemblies each comprising a set of balls in raceways. An annular gimbal on the first raceway's second member is constructed 415, to which the other raceway's "second member" is affixed 218,455,465. While urging the second members away from one another so as to deform the gimbal partially 222, the "first members" are then assembled into a common fixed or gimbaled assembly 226,465. This preload configuration will result in an X-type preload. Alternatively, step 465 can be performed with second members being urged toward one another so that a diamond-type preload will result.

All of the structures described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, steps of the above methods can be reordered while maintaining substantially the same functionality, without departing from the scope and spirit of the present invention. In addition, although the preferred embodiments described herein are largely directed to spindle bearing configurations especially suitable in magnetic disc drives, it will be appreciated by those skilled in the art that many teachings of the present invention can be applied to other systems without departing from the scope and spirit of the present invention.

What is claimed is:

1. A spindle bearing having an axis of rotation, comprising:

a first set of balls positioned for movement along a first circle about the axis;

a second set of balls positioned for movement along a second circle about the axis;

a first member configured for rolling engagement with the first set of balls;

a second member configured for rolling engagement with the second set of balls;

an annular gimbal operatively coupled between the first and second members and able to bend so that the first member moves axially with respect to the second member; and a third member configured for rolling engagement with both sets of balls so that the third member rotates with respect to the first and second members.

2. The spindle bearing of claim 1 in which each ball of the first set has an axis of compression forming an angle with the axis of rotation that is less than about 80 degrees.

3. The spindle bearing of claim 1 in which each ball of the first set has an axis of compression, in which the gimbal has a reference line along each radial half plane, the reference line intersecting the axis of rotation at an acute angle greater than 45 degrees, the reference line forming a compression transfer angle less than about 25 degrees.

4. The spindle bearing of claim 1 in which the gimbal has an average width and an average thickness, the width being at least twice as large as the width.

5. The spindle bearing of claim 1 in which the gimbal has an average width and an average thickness, the width being at most ten times as large as the thickness.

6. The spindle bearing of claim 1 in which the gimbal has a minimum thickness that is less than the diameter of the balls of the first set.

7. The spindle bearing of claim 1 in which the balls of the first set are made of a ceramic.

8. The spindle bearing of claim 1 in which the annular gimbal has a major surface that is substantially perpendicular to the axis.

9. The spindle bearing of claim 1 in which the first member has a modulus of elasticity, and in which each ball of the first set has a modulus of elasticity that is greater than the first member's modulus of elasticity.

10. The spindle bearing of claim 1 in which the first member and the first set each have a coefficient of thermal expansion, and in which the coefficient of the first member is greater than the coefficient of the first set.

11. The spindle bearing of claim 1 in which the gimbal is made by forming at least one annular slot about the first member.

12. A disc drive tolerant of temperature variation comprising:

the spindle bearing of claim 1; and a plurality of recording discs rigidly supported by a selected one of the members.

13. The spindle bearing of claim 1 in which the gimbal is thicker than about 0.4 millimeters.

14. A disc drive comprising:

a plurality of discs mounted on a spindle bearing; and means for compensating for temperature-induced ball bearing preload force variation in the spindle bearing.

* * * * *